United States Patent [19]

Uchida et al.

[11] Patent Number: 5,543,125
[45] Date of Patent: Aug. 6, 1996

[54] METHOD OF PURIFYING NON-CONTAINING EXHAUST GASES USING IRON CONTAINING MORDENITE

[75] Inventors: Hiroshi Uchida, Yokohama; Iruru Takahashi, Kunitachi; Ken-ichi Yamaseki, Mitaka; Shigeo Satokawa, Tokyo, all of Japan

[73] Assignee: Tokyo Gas Co., Ltd., Tokyo, Japan

[21] Appl. No.: 388,689

[22] Filed: Feb. 15, 1995

[30] Foreign Application Priority Data

Feb. 15, 1994 [JP] Japan .................. 6-042000
Jul. 27, 1994 [JP] Japan .................. 6-194799
Oct. 14, 1994 [JP] Japan .................. 6-276009
Dec. 9, 1994 [JP] Japan .................. 6-331559

[51] Int. Cl.$^6$ .................................................. B01J 8/00
[52] U.S. Cl. ................................................ 423/239.2
[58] Field of Search .......................... 423/239.2, 235

[56] References Cited

U.S. PATENT DOCUMENTS

| | | | |
|---|---|---|---|
| 4,046,888 | 9/1977 | Maeshima et al. | 423/239.1 |
| 4,157,375 | 6/1979 | Brown et al. | 423/239 |
| 4,978,514 | 12/1990 | Hofmann et al. | 423/235 |
| 5,149,512 | 9/1992 | Li et al. | 423/239 |
| 5,234,477 | 8/1993 | Gwyn | 44/387 |

FOREIGN PATENT DOCUMENTS

| | | |
|---|---|---|
| 0381236 | 8/1990 | European Pat. Off. . |
| 2-4453 | 1/1990 | Japan . |
| 2-194819 | 8/1990 | Japan . |

OTHER PUBLICATIONS

Database WPI, Section Ch, Week 9506, Derwent Publications Ltd., London, GB; & JP–A–06 319 954, 22 Nov. 1994, abstract.

*Primary Examiner*—Steven Bos
*Assistant Examiner*—Thomas G. Dunn, Jr.
*Attorney, Agent, or Firm*—Flynn, Thiel, Boutell & Tanis, P.C.

[57] ABSTRACT

A method of purifying NOx-containing exhaust gases characterized by using ammonium acetate as a reducing agent with a zeolite-based catalyst. $NO_x$ in $NO_x$-containing exhaust gases can be removed extremely effectively even at a low concentration thereof by using Fe-treated mordenite as a zeolite-based catalyst according to said method, and since it uses ammonium acetate as a reducing agent, an excellent effect free from ammonia leakage can be obtained. Particularly $NO_x$ in $NO_x$-containing exhaust gases can be removed effectively at and around a discharge temperature of an exhaust gas from a gas engine in the presence of ammonium acetate as a reducing agent by constituting Fe-containing mordenite as a monolithic material. Hence, it makes it possible to obtain an excellent effect of simplifying the whole denitration system without needing temperature control of an exhaust gas and/or a catalyst bed. In addition, the $NO_x$-purifying ability of the catalyst does not decrease over a long period of time.

10 Claims, 3 Drawing Sheets

METHOD OF PURIFYING NON-CONTAINING EXHAUST GASES USING IRON CONTAINING MORDENITE

BACKGROUND OF THE INVENTION

1. Field of the Invention

The present invention relates to a technique of purifying $NO_x$-containing exhaust gases by use of catalyst for purifying $NO_x$-containing exhaust gases comprising a zeolite material in the presence of ammonium acetate as a reducing agent.

2. Background Art

The incineration of industrial wastes and domestic refuse forms $NO_x$, CO, SOx, hydrochloric acid and offensive smells according to the origin, kind and composition of these wastes. Because of this, various measures have been taken to treat exhaust gases containing these irritants and further research and development has been conducted and the same may be said of exhaust gases exhausted from cars, thermal-power generation systems and co-generation systems employing a gas engine.

Particularly, regarding the treatment of NOx (nitrogen oxides) in various exhaust gases, various methods have been known as so-called smoke-exhaustion denitration techniques including non-catalytic reduction, catalytic cracking, non-selective or selective catalytic reducton, adsorption, electron rays irradiation, molten salt absorption and reduction absorption. Of the above, catalytic reduction performing purification using a catalyst in the treatment usually converts $NO_x$ to $N_2$ to make it harmless and hence has been noted particularly. As catalysts used for the catalytic reduction, noble metals such as Pt, Rh and Pd, metal oxides such as $TiO_2$, $V_2O_5$, $Cr_2O_3$ and $Fe_2O_3$, rare earth metal oxides and sulfides, and zeolite-based catalysts have been used.

Zeolites are used effectively as a catalyst itself and also as a carrier for various catalysts. Zeolites, in general, are characterized by comprising aluminosilicate in composition, being crystal line and having a three-dimensional network, and containing cations with high ion-exchange properties. There are a lot of kinds thereof according to the ratio of an alumina ($Al_2O_3$) component and a silica ($SiO_2$) component constituting it and the crystalline constitution thereof, and typical examples thereof include analcime, chabazite, mordenite, faujasite and clinoptilolite.

In addition to natural zeolites, synthetic zeolites are produced according to hydrothermal synthesis and are on the market. They are used broadly, for example, as fillers for paper, moisture-absorbing agents, ion exchangers, molecular sieves, catalysts for various reactions and carriers for catalysts, and denaturation, modification and other improvements thereof have been performed successively in accordance with various uses and reactions thereof. In the field of catalysts used for purifying $NO_x$-containing exhaust gases, it has been proposed to deposit a metal such as copper and iron on zeolites for some improvement in the purification efficiency.

For example, the official gazette of Japanese Laid-Open Patent Publication No. 2-194819/1990 shows a method of reducing nitrogen oxides present in an exhaust gas to nitrogen by mixing ammonia with said exhaust gas, and introducing the resultant mixture onto an acid-resistant zeolite catalyst containing Cu and/or Fe. However, it describes that the techniques of allowing the metals to be contained in the zeolite may be ion exchange, impregnation, or precipitation or mixing of metal oxides or metal salts with zeolites, and calcination in an oxidization or reduction atmosphere, or ammonia-containing atmosphere. Therefore, metals such as Fe are only contained in the ready-made zeolites by the aftertreatment and not contained in zeolites during the synthesis thereof.

Also, the official gazette of Japanese Laid-Open Patent Publication No. 2-4453/1990 proposes a method of producing a denitrating catalyst (namely, zeolite with a transition metal deposited thereon) for subjecting nitrogen oxides in an exhaust gas to catalytic reduction in the presence of ammonia. Here, zeolite catalysts are produced by using Al, Si, compounds of alkali metals or alkali earth metals and salts of transition metals as materials, adjusting molar ratios of the material components to predetermined ratios and subjecting a gel solution with an effective alakli concentration adjusted to a hydrothermal treatment. Transition metals, as raw materials, are specifically Cu, Fe, Ni, Co and V and the zeolites to be obtained here are mordenite and a pentasil-type zeolite.

In the above-mentioned catalytic reduction denitration, purifying $NO_x$ in a $NO_x$-containing exhaust gas by means of a catalyst, a reducing agent is indispensable. As reducing agents, ammonia, hydrogen, methane and other hydrocarbons, and carbon monoxide can be used. Of these agents, since ammonia is excellent in selective reactivity to NO, it is now adopted for practical use in denitration. The above official gazette of Japanese Laid-Open Patent Publication No. 2-194819/1990 and the official gazette of Japanese Laid-Open Patent Publication No. 2-4453/1990 make it essential to use ammonia as a reducing agent.

In this point, the official gazette of Japanese Laid-Open Patent Publication No. 2-203923/1990 points out problems such as an ammonia leak, when using ammonia as a reducing agent similarly to the case of the above art, and proposes the use of ammonium salts or amine compounds instead of ammonia. Ammonium salts in the proposal are ammonium carbonate, ammonium bicarbonate, ammonium formate and ammonium acetate, and the amino compound is urea. On the other hand, as catalysts in the proposal, known ones such as a carrier-depositing type, a non-carrier-depositing type and a Raney type can be used, and anatase-type titania with a metallic oxide such as $V_2O_5$ deposited thereon exhibits particularly excellent denitration performance. However, there is no description regarding a zeolite catalyst and only this $V_2O_5$ catalyst is described specifically in the proposal.

Also, the official gazette of Japanese Laid-Open Patent Publication No. 2-203923/1990 discloses, in the examples thereof, reaction ratios when introducing aqueous solutions of the above-exemplified reducing agents into a reaction tube, using "anatase-type titania with $V_2O_5$ deposited thereon (deposition ratio of vanadium: 4 weight %)" as a catalyst at a reaction temperature within the range of 200° to 450° C. to an exhaust gas containing NO of 100 ppm prepared for an experiment. According to the above, when using ammonium acetate as a reducing agent, almost the same effect as when using ammonia described as Comparative Example there is obtained.

However, these reaction ratios do not exceed the equivalent reaction of NO and a nitrogen atom in an ammonium salt.

That is, when using ammonia as a reducing agent in catalytic reduction denitration and, as described above, also when using ammonium salts such as ammonium carbonate, ammonium acetate, ammonium bicarbonate and ammonium formate, the reaction between a N atom in the reducing agent and NO in the exhaust gas is below the equivalent, and hence $NO_x$ (NO) beyond the amount of the reducing agent (in terms of N) added cannot be removed.

On the other hand, when treating an exhaust gas by means of a solid catalyst, the catalyst is employed ① in a form of a fluidized bed or a fixed bed as a particle, ② in a form of a fixed bed as a pellet, or ③ in a form of a monolith deposited on a monolithic carrier. Generally, they are selected according to origin and kind of $NO_x$-containing exhaust gases and other various requisites. However, there is no instance of showing that the form of a monolith in the above ③ improves performance as compared with the form of the above ① or ②.

SUMMARY OF THE INVENTION

It is an object of the present invention to provide a method of purifying $NO_x$-containing, or $NO_x$ and CO-containing exhaust gases that is capable of improving ratios of purifying $NO_x$ in exhaust gases sharply and also purifying CO effectively by using zeolite materials as a catalyst and ammonium acetate as a reducing agent in catalytic reduction denitration of exhaust gases. The present invention can also remove $NO_x$ beyond the added amount of the reducing agent by the use of zeolite catalysts having deposited therein a metal of a platinum group such as Rh.

It is another object of the present invention to provide a catalyst for purifying $NO_x$-containing exhaust gases comprising particularly mordenite among the zeolites, more particularly mordenite treated with Fe, in catalytic reduction denitration of $NO_x$-containing exhaust gases using ammonium acetate as a reducing agent, and a method of purifying $NO_x$-containing exhaust gases by use of said catalysts.

It is still another object of the present invention to provide catalysts for purifying $NO_x$-containing exhaust gases effectively in the presence of ammonium acetate as a reducing agent, the catalysts comprising Fe-treated mordenite selected from the group consisting of "Fe/mordenite" and "Fe-modified mordenite".

It is still another object of the present invention to provide a catalyst for purifying $NO_x$-containing exhaust gases comprising synthetic mordenite with. Fe contained in its structure by using an Fe-containing material during the synthesis thereof, having particularly excellent catalytic characteristics, even to an exhaust gas containing an extremely small amount of $NO_x$, and having an excellent $NO_x$-purifying ability, even under the condition of an extremely high space velocity, and a method of purifying $NO_x$-containing exhaust gases by use of said catalyst in the presence of ammonium acetate as a reducing agent.

It is still another object of the present invention to provide a catalyst for purifying $NO_x$-containing exhaust gases, which uses ammonium acetate as a reducing agent and exhibits a particularly excellent $NO_x$-purifying ability when using Fe-containing mordenite as a denitrating catalyst by using it as a form of a monolithic material as compared with using it as a particle or a pellet, and a method of purifying $NO_x$-containing exhaust gases by use of the monolithic catalyst in the presence of ammonium acetate as a reducing agent.

DETAILED DESCRIPTION

Figure 1A:
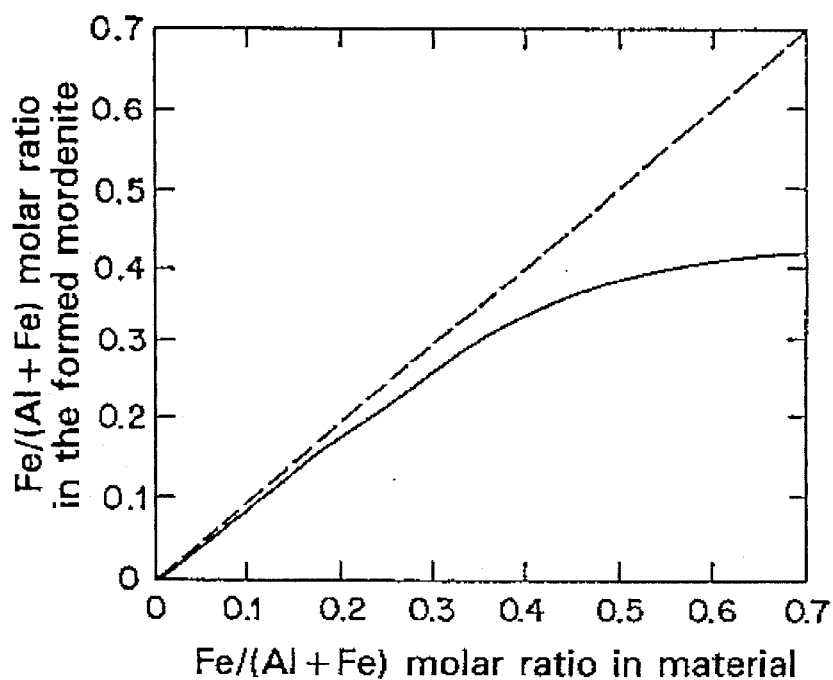
FIGS. 1(a) and 1(b) show the relationship between the Fe content in production materials and the Fe content in the formed mordenite.

First of all, the present invention is a method of purifying $NO_x$-containing exhaust gases characterized by using a zeolite catalyst as a catalyst and ammonium acetate as a reducing agent catalytic reduction denitration. Here exhaust gases may contain substantially $NO_x$ singly or may contain both $NO_x$ and CO as components to be purified according to the present invention.

As the above zeolite catalyst to be used in the present invention may be used both natural zeolite and synthetic zeolite. Examples thereof include mordenite, ZSM-5, ferrierite and faujasite. In addition, the effect of purifying $NO_x$ and CO can be increased by depositing a metal of platinum group on these catalysts according to an ordinary procedure.

Moreover, according to the present invention, not only $NO_x$ can be removed but also CO in an exhaust gas is rapidly oxidized and removed as $CO_2$ effectively, and the effect of removing CO can be accomplished almost perfectly when a metal of a platinum group is deposited on the zeolite catalyst. Particularly Pt of a platinum group is prone to convert NO to $NO_2$, and NO is consumed in an oxidization reaction and NO to be reduced to $N_2$ decreases. Hence, a preferable depositing metal is Rh or Pd.

The present invention is performed by introducing an exhaust gas into a catalyst layer provided in a reaction tube. As a method of adding ammonium acetate as a reducing agent, the following various techniques may be employed: (1) introducing it into a stream of an exhaust gas at a catalyst layer or upstream according to spraying or other techniques, (2) impregnating a zeolite catalyst with it in advance to deposition, and (3) employing both (1) and (2) in combination. It is advantageous to employ the technique of (1) with a view to performing the operation stably over a long period of time.

In the above denitration described in the official gazette of Japanese Laid-Open Patent Publication No. 2-203923/1990 using an ammonium salt as a reducing agent, it is impossible to use the reducing agent in an amount exceeding the amount corresponding to the amount of N contained therein, namely, beyond the amount of the equivalent reaction with NO. According to the present invention, however, ammonium acetate as a reducing agent can remove $NO_x$ beyond the amount thereof added (in terms of N).

However, the reducing agent in the present invention can be utilized beyond the amount of the equivalent reaction with NO in the presence of the zeolite catalyst, which exhibits extremely unusual characteristics and brings effective results, but the reason why is unclear. It is guessed that not only the ammonium content in ammonium acetate but also the acetate content ($CH_3COO$.) in it may have an effect upon the reaction.

Thus, the present invention exhibits removal effect beyond the equivalent amount to the amount of $NO_x$ in combination with ammonium acetate as a reducing agent with the zeolite catalyst, and can obtain an excellent effect free from leaking ammonium shown when using ammonia as a reducing agent.

The present invention can remove both $NO_x$ (NO) and CO in exhaust gases effectively by using a zeolite catalyst as a catalyst and ammonium acetate as a reducing agent in catalytic reduction denitration of exhaust gases and can further improve the removal effect by depositing a metal of a platinum group such as Rh on a zeolite catalyst.

Secondly, the present invention relates to a catalyst for purifying $NO_x$-containing exhaust gases with ammonium acetate as a reducing agent comprising mordenite treated with Fe (in the present specification, referred to as "Fe-treated mordenite")

Here, the above "Fe-treated mordenite" means (1) $Fe^{3+}$-deposited mordenite according to ion exchange (in the present specification, referred to as "Fe/mordenite") or (2) mordenite modified with $Fe^{3+}$ (in the present specification, referred to as "Fe-modified mordenite").

First of all, the above (1) "Fe-ion exchanged" catalyst may be obtained by subjecting mordenite to an ion exchange treatment with an aqueous Fe salt solution and depositing an Fe component thereupon, and examples of the Fe salt include nitrate, chlorides and acetate. In this case, as mordenite materials may both natural and synthetic ones may be used. Ions of the mordenite materials are not particularly restricted, and mordenites having various ions, such as alkali metals types including a K type and a Na type, alkali earth element metals types including a Mg type and a Ca type, an H type, an $NH_4^+$ type and composite ion types containing two kinds thereof, may be used.

Next, the above (2) "Fe-framework substituted mordenite" can be obtained by modifying mordenite by treatment with an aqueous solution of an Fe salt with strong acid properties (the treatment brings some change to the constitution itself such as a part of the Al in the mordenite constitution being substituted with Fe. However, the details of the content of changes have remained unexplained, including that a desired effect cannot be obtained by separating a part of the Al and then treating it with an aqueous Fe salt solution) and then calcining it on demand.

In this case, as the above aqueous solution of an Fe salt with strong acid properties may be used, an aqueous solution of Fe nitrate or an aqueous solution of Fe chloride is particularly advantageous. The modification treatment can be performed more effectively by using these aqueous solutions with a pH adjusted to about 1 or less, particularly 0.8 or less.

Moreover, the modification treatment can be performed more effectively by performing the treatment with heating the solution (to the boiling point of the solution).

As mordenite materials of the above (2) "Fe-framework substituted mordenite" catalyst both natural and synthetic ones may be used; and ions of the mordenite materials are not particularly restricted and the mordenite materials having various types of ions such as alkali metals types including a K type and an Na type, alkali earth element metals types including an Mg type and a Ca type, a H type, an $NH_4^+$ type and composite ion types containing two kinds thereof may be used.

The catalyst for purifying $NO_x$-containing exhaust gases according to the present invention may be used, for example, by providing it into a reaction tube as a catalyst layer and passing a $NO_x$-containing exhaust gas through it to perform purification. However, it is not restricted to the above mode of use and can be used according to various modes conventionally known. As a method of adding ammonium acetate as a reducing agent, for example, the following various techniques may be employed: (a) introducing it into stream of an exhaust gas at a catalyst layer or upstream thereof by spraying or other techniques, (b) impregnating a catalyst with it in advance of deposition, and (c) employing both (a) and (b) in combination. It is advantageous to employ the technique of (a) with a view to performing the operation stably over a long period of time.

According to the present invention, the purification ratio of $NO_x$ in $NO_x$ exhaust gases can be sharply increased and improved by using these catalysts together with ammonium acetate as a reducing agent, and particularly, an excellent effect of removing $NO_x$ can be obtained at the low-temperature range of about 300° to 325° C.

Thirdly, the present invention provides a catalyst for purifying $NO_x$-containing exhaust gases with ammonium acetate as a reducing agent, which is characterized by comprising synthetic mordenite with $Fe^{3+}$ contained therein by using an Fe-containing material during synthesis thereof, and moreover, the present invention provides a method of purifying $NO_x$-containing exhaust gases by use of synthetic mordenite Fe contained therein, which is obtained by using an Fe-containing material during the synthesis thereof, and ammonium acetate as a reducing agent.

The synthetic mordenite catalyst with Fe contained therein according to the present invention can be produced by allowing a material containing Fe, such as Fe nitrate, to exist as a material component itself in addition to an alumina material, such as sodium aluminate, a silica material, such as amorphous silica, and an alkali metal compound, such as caustic soda, or an alkali earth metal compound, as synthetic material components during the production of mordenite by hydrothermal synthesis, and subjecting an aqueous solution of the material to hydrothermal reaction in an autoclave.

An alumina material may be used, in addition to sodium aluminate, such as alumina sol, alumina gel, aluminum sulfate, aluminum nitrate and aluminum hydroxide, and a silica material may be used such as amorphous silica, water glass, silica sol, silica gel, diatomaceous earth and clay minerals. In the present invention, an Fe-containing material is allowed to exist as a material component itself in addition to these materials, and an Fe-containing material may be used such as Fe chloride, Fe bromide, Fe oxides, Fe sulfate and organic Fe compounds in addition to the above Fe nitrate. Regarding the ratio of an amount of each material, an amount corresponding to a composition capable of obtaining a reaction product with a mordenite constitution may be used.

Figure 1B:
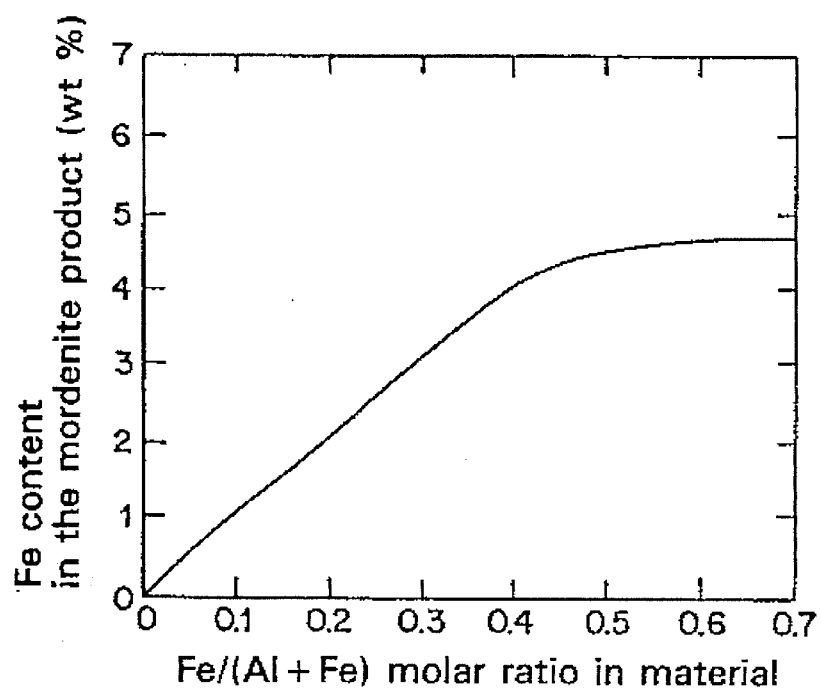

FIG. 1(a) and (b) show the relationship between the change of the amount of an Fe material in producing materials by the above synthesis and the amount of Fe contained in the mordenite product obtained according to the change. FIG. 1(a) shows the "Fe/(Al+Fe)" molar ratio in the formed mordenite to the "Fe/(Al+Fe)" molar ratio in the materials, and FIG. 1(b) shows the Fe content (weight %) in the formed mordenite to the "Fe/(Al+Fe)" molar ratio in the materials.

As shown in FIG. 1(a), Fe added into the materials is contained in the formed mordenite structure as it is until the "Fe/(Al+Fe)" molar ratio is less than 0.4 and hereinafter as the amount of Fe increases gradually, the ratio of Fe taken into the formed mordenite structure decreases. However, as shown in FIG. 1(b), Fe may be contained in an amount around 5 weight % in the formed mordenite structure. In addition, though Na/Al (ratio of numbers of atoms) is 1 in an Na-type mordenite, Na is contained in the above mordenite structure with Fe present therein in an amount corresponding to Na/(Al+ Fe)= 1, showing no change in the content.

Figure 2:
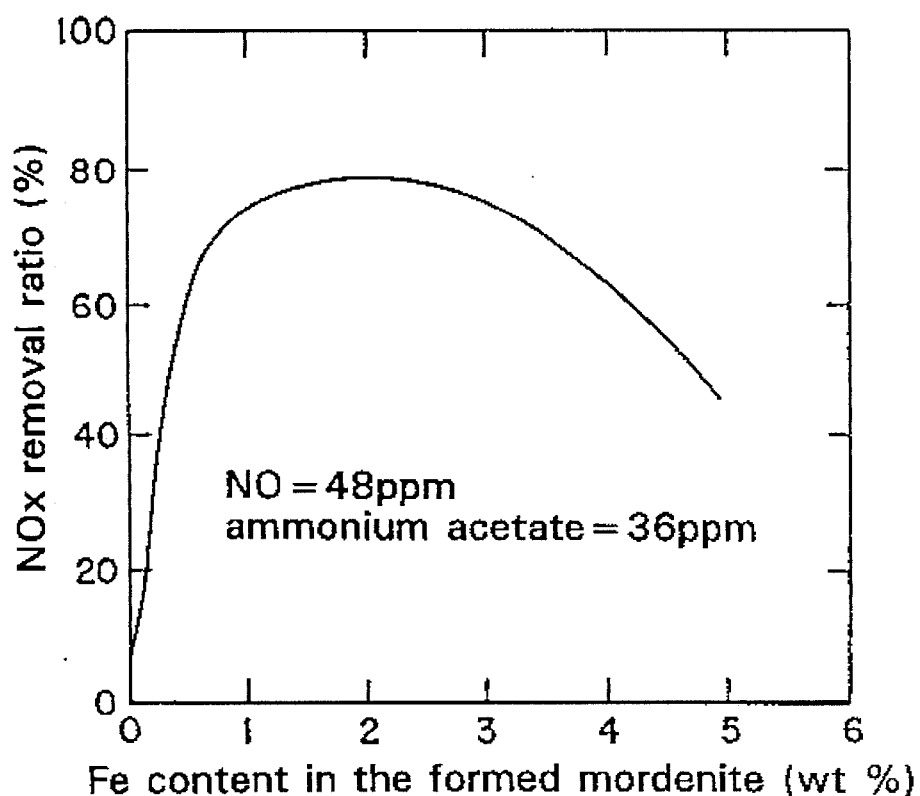
FIG. 2 shows the relationship between the Fe content in the formed mordenite and $NO_x$ removal ratios.
Figure 3A:
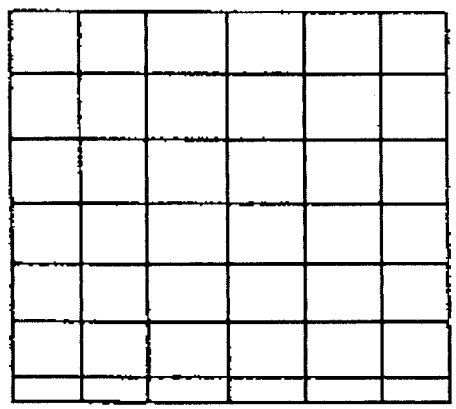
FIGS. 3(a) and 3(b) are sectional views showing examples of a monolithic catalyst to be applied in the present invention.
Figure 3B:
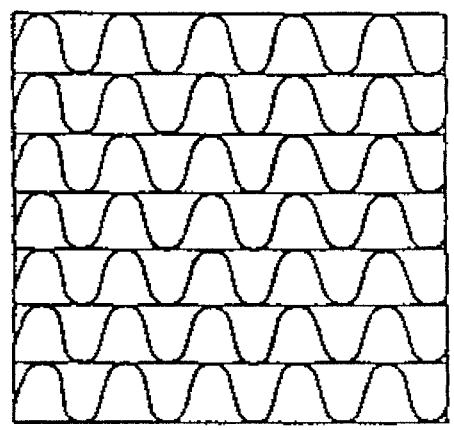
Figure 4:
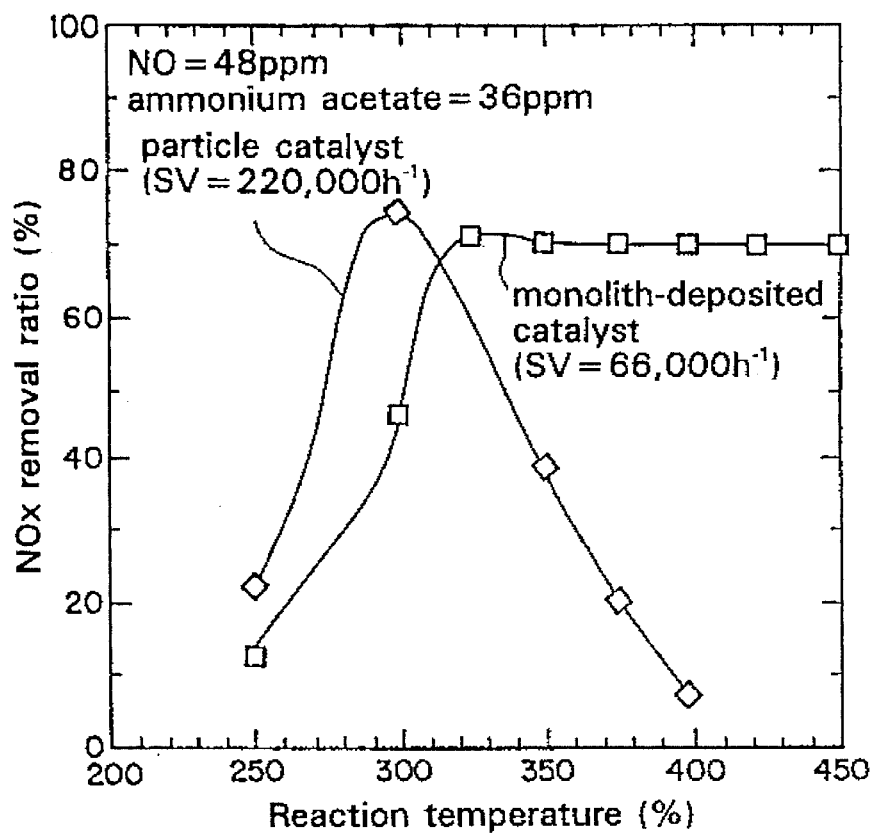
FIG. 4 shows the change of treatment temperatures and $NO_x$ removal ratios when using a monolith-deposited catalyst and a pulverized particle catalyst.

FIG. 2 shows the relationship between the Fe content in the synthetic mordenite structure of the present invention and $NO_x$ removal ratios by experiments [Si/Al molar ratio: 5 to 10; treatment temperature (= reaction temperature): 300° C.; conditions of a gas to be treated and space velocity are the same as in the Example to be described later]. As shown in the drawing, a $NO_x$ removal ratio beyond 50% is shown at an Fe content of 0.3 to 4.7 weight %, and a $NO_x$ removal ratio beyond 60% can be obtained at an Fe content of 0.4 to 4.2 weight %. Here, a $NO_x$ removal ratio is calculated according to the following equation (1), in which the concentration of $NO_x$ before the treatment is shown as X and the concentration of $NO_x$ after the treatment as Y. The same is true of the $NO_x$ removal ratio in the Examples.

$$\text{NOx removal ratio (\%)} = \frac{X - Y}{X} \times 100 \quad (1)$$

Mordenite is one kind of aluminosilicate and has a rhombic form with a channel system therein. In the present invention, one with an Si/Al molar ratio in composition within a range of 5 to 50 ($SiO_2/Al_2O_3$ molar ratio: 10 to 100) may be employed effectively as a catalyst for $NO_x$-containing exhaust gases. Hence, the amounts of a silica material and an alumina material may be selected according to the final composition, and the above-described Fe material to be contained therein is added in an amount necessary for obtaining the characteristics shown in FIG. 2 according to the trend and facts shown in FIG. 1(a) and (b).

The synthesis in the present invention is performed according to hydrothermal reaction. It is performed under the heating condition of about 100° to 200° C., preferably about 150° to 190° C., and under spontaneous pressure in an autoclave or under a higher pressure. The reaction may be performed and left to stand to allow Fe to exist surely and firmly in the structure of the formed mordenite and from the viewpoints of a yield and a reaction rate thereof. However, it is preferable perform the reaction under the condition of stirring, particularly under mild stirring. In the operation of mixing materials, Fe can surely be present in the structure of the formed mordenite by adding an aqueous solution of an Fe-containing material into an aqueous solution containing an alumina material, a silica material and an alkali metal compound or an alkali earth metal compound slowly, dropwise, under stirring, to obtain a uniform mixed solution.

According to the above process of production, the obtained synthetic mordenite with Fe contained in its structure has excellent characteristics. The catalyst has excellent $NO_x$-purifying ability also when the concentration of $NO_x$ in an exhaust gas is low, and also, extremely excellent catalytic characteristics of a $NO_x$ removal ratio of 60–78% (and that at a relatively low treatment temperature of 300° to 325° C.) are exhibited under instantaneous, severe treatment conditions such as a space velocity of 220000 $hr^{-1}$.

As a method of adding ammonium acetate as a reducing agent when performing the present invention by passing an exhaust gas through a catalyst layer provided in a reaction tube, the following various techniques may be employed: (1) introducing it into a stream of an exhaust gas at a catalyst layer or upstream according to spraying or other techniques, (2) impregnating a zeolite catalyst with it in advance of deposition, and (3) employing both (1) and (2) in combination. It is advantageous to employ the technique of (1) with a view of performing the operation stably over a long period of time.

In addition, the catalyst comprising synthetic mordenite with Fe contained in its structure during the synthesis thereof according to the present invention has an excellent $NO_x$-purifying ability even with an extremely low concentration of $NO_x$ in an exhaust gas, and hence can reduce and purify an extremely small amount of $NO_x$ in a dilute combustion exhaust gas from a gas engine and the like effectively. Besides, since it uses ammonium acetate as a reducing agent, an excellent effect free from leaking ammonia, can be obtained.

Fourthly, the present invention provides a catalyst for purifying $NO_x$-containing exhaust gases comprising Fe-containing mordenite with ammonium acetate as a reducing agent, said Fe-containing mordenite being constituted as a monolithic material, and moreover provides a method of purifying $NO_x$-containing exhaust gases by means of a monolithic catalyst composed of Fe-containing mordenite as a monolithic material and ammonium acetate as a reducing agent.

Here, the above form of "Fe-containing mordenite constituted as a monolithic material" can be obtained by (1) forming Fe-containing mordenite into a monolithic shape by means of a binder such as silicate (water glass and the like) and phosphate, or (2) depositing Fe-containing mordenite on a monolithic carrier formed in advance. As a form of the monolithic material may be employed one with a honeycomb section and those with forms conventionally known as monolithic carriers. FIG. 1(a) and (b) show enlarged sectional views of some examples to be used in the present invention.

When (2) depositing Fe-containing mordenite on a monolithic carrier formed in advance, materials of the monolithic carrier are not particularly restricted. Preferably ceramics or metals are used, and as a ceramic, cordierite preferably may be used and as metals, an iron-aluminum-chrome-based alloy and stainless steel preferably may be used.

As a method of deposition, a monolith-deposited catalyst can be obtained by mixing a catalyst powder with water and a binder such as alumina sol, and stirring the mixture to obtain an aqueous suspension, impregnating a monolithic carrier with the aqueous suspension (namely, wash-coating), removing excess adhered slurries by means of an air gun and the like, drying the resultant product, and calcining it. Excess adhered materials are removed by means of an air gun and the like after the calcination if needed.

As the above "Fe-containing mordenite catalyst" in the present invention may be used an "Fe-ion exchanged mordenite catalyst", an "Fe-framework substituted mordenite catalyst", and synthetic mordenite catalyst with Fe contained in its structure during the synthesis thereof.

The monolithic catalyst according to the present invention can be obtained by forming these Fe-containing mordenite catalysts into monolithic materials or depositing them on monolithic carriers according to a proper technique, as described above.

The purification of a $NO_x$-containing exhaust gas by means of a monolithic catalyst in the present invention is performed by providing the monolithic catalyst SO that the monolithic opening in a reaction tube faces the direction of the flow of the exhaust gas, and passing the $NO_x$-containing exhaust gas through the monolithic catalyst. The addition of ammonium acetate as a reducing agent is performed by introducing it into a stream of an exhaust gas just before the monolithic catalyst or upstream according to spraying or other techniques. In this case, $NO_x$ in the exhaust gas can be purified effectively from the start, namely, from the beginning of the operation of purification, by impregnating the monolithic catalyst with ammonium acetate in advance of deposition.

As described above, the monolithic catalyst according to the present invention has $NO_x$-purifying ability effective within a broad range of temperature and can be used effectively over a long period of time. Since it can remove $NO_x$ effectively at and around a discharge temperature of an exhaust gas from a gas engine, it makes it possible to obtain an excellent effect of simplifying the whole denitration system without needing temperature control of an exhaust gas and/or a catalyst bed.

In addition, the monolithic catalyst according to the present invention has an excellent $NO_x$-purifying ability, even with an extremely low concentration of $NO_x$ in an exhaust gas, and hence can reduce and purify an extremely small amount of $NO_x$ in an exhaust gas from a gas engine and the like effectively. Besides, since it uses ammonium acetate as a reducing agent, an excellent effect free from ammonia slipping shown when using ammonia or urea as a reducing agent can be obtained.

Cleaning Test

Subsequently, using these specimen catalysts (each 4.5 ml), experiments of purifying a $NO_x$ and CO-containing exhaust gas were performed. As an exhaust gas to be treated, a gas containing 91 ppm of NO, 910 ppm of CO, 9.1% of $O_2$, 6.8% of $CO_2$ and 9.1% of steam was used ($N_2$: balance), and experiments were conducted at a treatment temperature of 300° to 350° C. and at a space velocity of 44000 $hr^{-1}$.

In this case, ammonium acetate was sprayed into the reaction tube just before a catalytic layer as an aqueous solution and introduced into it so that the amount of the reducing agent should be 45 ppm (in terms of N) in the exhaust gas to be treated. The results are shown in Table 1. The example employing ammonia in Table 1 is shown for comparison.

As shown in Table 1, it is apparent that both $NO_x$ (NO) and CO in an exhaust gas are removed effectively by using ZSM-5 and mordenite, typical zeolites, as a catalyst and using ammonium acetate as a reducing agent, though there exist differences according to treatment temperatures (exhibiting higher efficiency at a low temperature of about 300° C. ).

TABLE 1

| Catalyst | Reducing agent (45 ppm) | Reaction temperature (°C.) | $NO_x$ removal ratio (%) | NO removal ratio (%) | CO removal ratio (%) | Amount of $NO_x$ removed/ amount of a reducing agent |
|---|---|---|---|---|---|---|
| ZSM-5 | Ammonium acetate | 300 | 44.0 | 44.0 | 71.5 | 0.89 |
|  | Ammonium acetate | 350 | 22.0 | 22.0 | 88.6 | 0.44 |
| Rh/ZSM-5 | Ammonium acetate | 300 | 57.7 | 84.2 | 100.0 | 1.17 |
|  | Ammonium acetate | 350 | 18.4 | 71.6 | 100.0 | 0.37 |
| Mordenite | Ammonium acetate | 300 | 49.0 | 49.0 | 71.7 | 0.99 |
|  | Ammonium acetate | 350 | 24.5 | 24.5 | 75.4 | 0.50 |
| Rh/mordenite | Ammonium acetate | 300 | 66.3 | 91.8 | 100.0 | 1.34 |
|  | Ammonium acetate | 350 | 16.8 | 72.4 | 100.0 | 0.34 |
| Rh/mordenite | Ammonia | 300 | 39.0 | 75.8 | 100.0 | 0.79 |
|  | Ammonia | 350 | 12.0 | 70.7 | 100.0 | 0.24 |

Hereunder, Examples of the present invention will be described, but the present invention is not limited to said Examples by any means.

EXAMPLE I

ZSM-5 and mordenite were prepared for use as specimen catalysts. As a reaction device was used a fixed bed running-type reaction device, which comprises a stainless steel reaction tube with an inner diameter of 10 mm and a length of 300 mm.

Rh was deposited on some catalysts of ZSM-5 and mordenite. The deposition was performed by subjecting ZSM-5 and mordenite to an ion exchange treatment with an aqueous solution of Rh chloride($RhCl_3$), drying them, and calcining them to produce Rh-deposited ZSM-5 and Rh-deposited mordenite.

Looking at examples of depositing Rh on ZSM-5 and mordenite in Table 1, apparently the removal effect is further improved. CO is removed almost completely in these cases, and particularly the removal ratio of $NO_x$ (NO) increases considerably as compared with using ammonia to exhibit an excellent removal effect.

Similarly when depositing Rh on ZSM-5 and mordenite, "Amount of $NO_x$ removed/amount of a reducing agent" in the Table shows that the ratio is 1.17 in Rh/ZSM-5 and 1.34 in Rh/mordenite. Thus, the removal effect beyond the equivalent amount is shown to the amount of $NO_x$ and compared with the ratio of 0.79 in ammonia which is known as an excellent reducing agent. Apparently it is a special effect specific to the catalyst and ammonium acetate (the reducing agent) in the present invention.

EXAMPLE II

In the present Example II, a commercially available Na-type mordenite [$SiO_2/Al_2O_3$ (molar ratio)=13] was prepared as a catalyst material, and a predetermined amount thereof was converted to an H type by ammonia water by subjecting it to ion exchange by ammonia water and then separating $NH_4^+$ from it according to heating it to convert it to an H type (=proton type). The resultant products were subjected to an Fe ion exchange treatment and an Fe-modification treatment with an aqueous Fe salt solution as below to prepare specimen catalysts.

Of them, the on exchange treatment with an Fe salt on a Na-type mordenite was performed by using an aqueous Fe nitrate [ferric nitrate: $Fe(NO_3)_3$] solution (concentration: 1 mol/l) as a treatment liquid, introducing mordenite into this solution, subjecting the reaction solution to ion exchange for 4 hours and calcining it at a temperature of 500° C. for 3 hours. The amount of Fe deposited at the end of the treatment, namely, the content thereof, was 2.1% (weight %; hereinafter, same as above). The H-type mordenite was also subjected to similar treatment to obtain an Fe=ion exchanged mordenite specimen with an amount of deposited of 0.3%.

On the other hand, regarding an Fe-modification treatment, a Na-type mordenite was treated with an aqueous nitric acid solution of Fe nitrate for 2 hours to for modification. The concentration of the aqueous Fe nitrate solution was 1 mol/l. The pH of the aqueous solution was 0.3, and the amount of Fe deposited at the end of the treatment, namely, the content thereof, was 1.4%. The H-type mordenite was also subjected to similar modification treatment to obtain an Fe-modified mordenite specimen with an amount of Fe deposited of 0.3%.

Cleaning Test

Subsequently, using these specimen catalysts(each 4.5 ml), experiments of purifying a $NO_x$ and CO-containing exhaust gas were performed. As a reaction device was used a fixed bed running-type reaction device, which comprises a stainless steel reaction tube with an inner diameter of 10 mm. As an exhaust gas to be treated a gas containing 48 ppm of NO, 910 ppm of CO, 6.8% of $CO_2$, 9.1% of $O_2$, 9.1% of steam, 36 ppm of ammonium acetate and $N_2$ as balance, was used, and experiments were conducted at treatment temperatures of 300° and 325° C., and at a space velocity of 44000 $hr^{-1}$.

In this case, ammonium acetate was sprayed into the reaction tube just before a catalytic layer as an aqueous solution and introduced into it so that the amount should be 36 ppm ( in terms of N) in the exhaust gas to be treated. The results are shown in Table 2. In Table 2, those shown as ① use an H-type mordenite as a material, while those shown as ② use an Na-type mordenite as a material, and the example of non-treated mordenite is for comparison.

As shown in Table 2, it is apparent that $NO_x$ (NO) in an exhaust gas is removed extremely effectively at low treatment temperatures of 300° and 325° C. using ammonium acetate as a reducing agent and at the same time, using "Fe-ion exchanged mordenite" and "Fe-framework substituted mordenite" according to the present invention as catalysts.

Looking at examples of the H-type mordenite in Table 2, while the removal ratios of $NO_x$ of the non-treated mordenite are 20.4% and 46.9 at reaction temperatures of 300° C. and 325° C. respectively, those of the Fe-ion exchanged mordenite ① are 47.2% and 60.4% and further those of the Fe-framework substituted mordenite ① are 57.7% and 73.1% and both show high ratios.

Nearly the same effect of removing $NO_x$ can be exhibited by using a Na-type mordenite. Looking at the case of a reaction temperature of 300° C., for example, while the removal ratio of $NO_x$ of the non-treated Na-type mordenite ② is only 17.0%, that of the Fe-ion exchanged mordenite ② is 50.0% and that of the Fe-framework substituted mordenite ② is 62.3% and both show high ratios.

TABLE 2

| Catalyst used | Reaction temperature (°C.) | $NO_x$ removal ratio (%) |
|---|---|---|
| Mordenite (non-treated) ① | 300 | 20.4 |
|  | 325 | 46.9 |
| Fe-ion exchanged mordenite ① | 300 | 47.2 |
|  | 325 | 60.4 |
| Fe-ion exchanged mordenite ① | 300 | 57.7 |
|  | 325 | 73.1 |
| Mordenite (non-treated) ② | 300 | 17.0 |
|  | 325 | 34.0 |
| Fe/mordenite ② | 300 | 50.0 |
|  | 325 | 46.3 |
| framework substituted Fe-mordenite ② | 300 | 62.3 |
|  | 325 | 60.4 |

EXAMPLE III

The present Example III will show, first of all, an example of producing a synthetic mordenite catalyst with Fe contained in its structure during the process of production thereof, and then describe an example of an experiment of purifying a $NO_x$-containing exhaust gas performed by using this catalyst.

Example of Production

First of all, as materials for production, commercially available sodium aluminate, sodidum hydroxide and amorphous silica (Nipsil VN3; manufactured by Nippon Silica Kogyo; trade name) was used and as an Fe material was prepared Fe nitrate nonahydrate [$Fe(NO_3)_3$ $9H_2O$] was used. Sodium aluminate and sodium hydroxide were put into distilled water in a beaker (volume: 100 0 ml), stirred and dissolved, and amorphous silica was introduced therein to make a liquid A. On the other hand, Fe nitrate nonahydrate was dissolved into distilled water in a beaker (volume: 500 ml) to make a liquid B. The quantity ratios of materials and distilled water in the liquid A and the liquid B are as shown in Table 3.

Next, the liquid B was added into the total amount of the liquid A dropwise slowly and stirred to make a uniform mixed solution, which was transferred into a stainless steel autoclave equipped with a rotary stirrer and a Teflon® vessel in the inside (inner volume: 1000 ml) and sealed, and then a hydrothermal reaction was performed. The reaction was performed under stirring (300 rpm) maintaining a temperature of 180° C., and after the treatment condition was maintained three whole days and nights (72 hours), heating was stopped to allow it to stand and the reaction product was cooled to normal temperature according to natural cooling.

Subsequently, the reaction product was filtered, washed with water t i 11 the pH of the slurry became less than 10, and dried at 80° C. overnight to obtain a powdery reaction product. The reaction product was subjected to X-ray diffraction (XRD) and each sample showed a clear mordenite structure (Na type). As a result of fluorescent X-ray diffraction, it was revealed that each of the samples with Fe nitrate nonahydrate added in synthetic materials thereof contained a predetermined amount of Fe in its structure. The above conditions and results of each sample are shown in Table 3. In Table 3, a case of production without adding the liquid B is shown as the Comparative Example.

Subsequently, to each of the Na-type Fe-containing mordenites (reaction products of Examples 1–8 in Table 3) were added 0.5 mol/l (81 g/1000 ml) of an aqueous ammonium nitrate solution (about 5 times equivalent of Na=500 ml/Na-type Fe mordenite 20 g), and the mixed solution was stirred at 60° C. for one hour, filtered and washed with water. This treatment was repeated again and then the reaction product was dried at 110° C. for about 5 hours. Further, it was calcined at 500° C. for 2 hours, and an H-type Fe-containing mordenite of each sample was obtained and used as a specimen catalyst in the following experiment of purifying $NO_x$-containing exhaust gases. An H-type mordenite was obtained similarly in the Comparative Example. Each sample of these Na-type Fe-containing mordenites converted to H-type was subjected to fluorescent X-ray diffraction similarly as above, and no change of Fe content was observed.

and the experiment was conducted at a treatment temperature of 250° to 400° C. and at a space velocity of 220000 $hr^{-1}$.

A fixed bed running-type reaction device was used as a reaction device in the experiment of purification and ammonium acetate as a reducing agent was sprayed into the reaction tube just before a catalytic layer as an aqueous solution thereof and introduced into it so that the amount of the reducing agent should be 36 ppm (in terms of N) in the exhaust gas to be treated. The results are shown in Table 4. In Table 4, $NO_x$ removal ratios were measured at reaction temperatures of 250°, 300°, 325°, 350°, 375° and 400° C.

Comparative Example 1 used mordenite containing no Fe in its structure and was produced without adding any Fe material during the process of production thereof.

Further, in Table 4, Comparative Examples 2–3 performed an experiment of purification according to the method of the above Japanese Laid-Open Patent Publication No. 2-203923/1990 by using a catalyst produced according to Examples described there and ammonium acetate as a reducing agent. The catalyst was obtained by dipping 40 g of $TiO_2$ (anatase-type) in an aqueous ammonium metavanadate solution (3.57 g/300 ml of water) overnight, subsequently removing water at a temperature of 50° C. under vacuum by means of an evaporator and calcining the resultant product at 400° C. for 3 hours. The vanadium deposition ratio of the thus obtained catalyst was 3.2 weight %. Comparative Example 2 was performed at a space velocity of 44000 $hr^{-1}$, while Comparative Example 3 at a space velocity of 220000 $hr^{-1}$.

As shown in Table 4, it is apparent that Examples 1–8, namely, the mordenite catalysts with Fe contained in their structures during the synthesis thereof, can remove and purify $NO_x$ in an exhaust gas extremely effectively in the presence of ammonium acetate as a reducing agent, even at an extremely low concentration of 48 ppm of NO content in an exhaust gas, and that they show excellent characteristics at a relatively low temperature of 300° to 325° C.

For example, while the $NO_x$ removal ratios in Comparative Example 1 (H-type mordenite with no Fe contained

TABLE 3

| Example No. | Material liquid A (g) | | | | Material liquid B (g) | | Reaction conditions | | Reaction product | |
|---|---|---|---|---|---|---|---|---|---|---|
| | Sodium hydroxide | Sodium aluminate | Nipsil VN3 | Distilled water | Fe nitrate nonahydrate | Distilled water | Temperature (°C.) | Hour (h) | XRO pattern | Fe content (weight %) |
| Comp. Ex. | 3.54 | 27.58 | 81.80 | 540 | — | — | 180 | 48 | Mordenite | 0.00 |
| 1 | 4.28 | 27.03 | 81.80 | 440 | 1.62 | 100 | 180 | 72 | Mordenite | 0.27 |
| 2 | 5.38 | 26.20 | 81.80 | 440 | 4.04 | 100 | 180 | 72 | Mordenite | 0.59 |
| 3 | 7.22 | 24.82 | 81.80 | 440 | 8.08 | 100 | 180 | 72 | Mordenite | 1.14 |
| 4 | 9.07 | 23.46 | 81.80 | 440 | 12.12 | 100 | 180 | 72 | Mordenite | 1.50 |
| 5 | 10.91 | 22.06 | 81.80 | 440 | 16.16 | 100 | 180 | 72 | Mordenite | 2.28 |
| 6 | 14.60 | 19.30 | 81.80 | 440 | 24.24 | 100 | 180 | 72 | Mordenite | 3.12 |
| 7 | 18.29 | 16.54 | 81.80 | 440 | 32.32 | 100 | 180 | 72 | Mordenite | 4.29 |
| 8 | 21.98 | 13.79 | 81.80 | 440 | 40.40 | 100 | 180 | 72 | Mordenite | 4.50 |

Cleaning Test

Using 0.5 ml of each of the thus obtained specimen catalysts (catalysts obtained by converting the reaction products of Examples 1–8 and Comparative Example in Table 3 to H-type), an experiment of purifying a $NO_x$-containing exhaust gas was performed. As an exhaust gas to be treated containing 48 ppm of NO, 910 ppm of CO, 6.8% of $CO_2$, 9.1% of $O_2$, 9.1% of steam and $N_2$ as the balance was used, therein) at reaction temperatures of 300° C. and 325° C. are only 7.4% and 9.3% respectively, those of Example 3 are 64.8% and 59.3% and further those of Example 5 are 77.4% and 60.0%, both showing high ratios. Since they are values obtained under instantaneous, severe conditions of a space velocity of 220000 $hr^{-1}$, it is apparent that they show an extremely excellent effect of removing $NO_x$.

TABLE 4

| Example No. | Kind of catalyst | Fe content in catalyst (weight %) | Space velocity (hr$^{-1}$) | NO$_x$ removal ratio (%) | | | | | |
|---|---|---|---|---|---|---|---|---|---|
| | | | | 250° C. | 300° C. | 325° C. | 350° C. | 375° C. | 400° C. |
| 1 | Mordenite | 0.27 | 220000 | 14.3 | 42.9 | 55.4 | 55.4 | 13.5 | 7.1 |
| 2 | " | 0.59 | 220000 | 16.7 | 66.7 | 66.7 | 48.1 | 18.5 | 14.8 |
| 3 | " | 1.14 | 220000 | 14.8 | 64.8 | 59.3 | 51.9 | 16.7 | 3.7 |
| 4 | " | 1.50 | 220000 | 21.8 | 74.5 | 60.0 | 52.7 | 20.0 | 7.3 |
| 5 | " | 2.28 | 220000 | 20.8 | 77.4 | 60.4 | 56.6 | 28.3 | 13.2 |
| 6 | " | 3.12 | 220000 | 17.3 | 63.5 | 59.6 | 48.1 | 23.1 | 9.6 |
| 7 | " | 4.29 | 220000 | 16.9 | 58.5 | 59.2 | 48.1 | 28.5 | 12.3 |
| 8 | " | 4.50 | 220000 | 16.7 | 53.7 | 55.6 | 48.1 | 29.6 | 18.5 |
| Comp. Ex. 1 | " | 0.00 | 220000 | 3.7 | 7.4 | 9.3 | 5.6 | 0.0 | 0.0 |
| Comp. Ex. 2 | TiO$_2$/V$_2$O$_5$ | — | 44000 | 45.5 | 41.8 | 36.4 | 30.9 | 23.6 | 16.4 |
| Comp. Ex. 3 | " | — | 220000 | 12.7 | 12.7 | 9.1 | 5.5 | 0.0 | 0.0 |

*Examples 1–8 and Comparative Examples 1–3 used ammonium acetate as a reducing agent.
**Comparative Examples 2–3 used anatase-type titania (TiO$_2$) with V$_2$O$_5$ deposited thereon produced according to Japanese Laid-Open Patent Publication No. 203923/1990 as a catalyst. Comparative Example 2 used the catalyst in an amount of 2.5 ml, 5 times the amount (0.5 ml) of Comparative Example 3.

Moreover, though Comparative Example 2 also uses ammonium acetate as a reducing agent, it exhibits a considerable denitration ratio under a relatively mild condition of a space velocity of 44000 hr$^{-1}$ (though the highest denitration ratio is 45.5% at a temperature of 300° C.). On the other hand, though Comparative Example 3 performed at a space velocity of 220000 hr$^{-1}$ also uses ammonium acetate as a reducing agent, it only exhibits a highest denitration ratio of 12.7% (250°, 300° C.) and fails to obtain a desired denitration effect.

EXAMPLE IV

The present Example IV and Comparative Example will describe an example of producing an Fe-containing synthetic mordenite catalyst (an example of producing a synthetic mordenite catalyst with Fe contained in its structure during the process of production thereof), an example of preparing a monolith-deposited catalyst with said catalyst deposited on a monolithic carrier and a pulverized particle catalyst as the Comparative Example, and an example of an experiment of purifying NO$_x$-containing exhaust gases performed by use of them.

Example of Production of an Fe-Containing Synthetic Mordenite Catalyst

First of all, materials for production used were commercially available sodium aluminate, sodidum hydroxide and amorphous silica (Nipsil VN$_3$; manufactured by Nippon Silica Kogyo; trade name) and a Fe material used was Fe nitrate nonahydrate [Fe(NO$_3$)$_3$ 9H$_2$O]. Of them, 23.46 g of sodium aluminate and 9.07 g of sodium hydroxide were put into 440 g of distilled water in a beaker (volume: 1000 ml), stirred and dissolved, and 81.80 g of amorphous silica was introduced therein to make a liquid A. On the other hand, 12.12 g of Fe nitrate nonahydrate were dissolved into 100 g of distilled water in a beaker (volume: 500 ml) to make a liquid B.

Next, the liquid B was added into the total amount of the liquid A dropwise slowly and stirred to make a uniform mixed solution, which was transferred into a stainless steel autoclave equipped with a rotary stirrer and a Teflon® vessel in its inside (inner volume: 1000 ml) and sealed, and then a hydrothermal reaction was performed. The synthesis was performed under stirring (300 rpm) while maintaining temperature of 180° C., and after the treatment condition was maintained three whole days and nights (72 hours), heating was stopped to allow it to stand and the reaction product was cooled to normal temperature according to natural cooling. Subsequently, the reaction product was filtered, washed with water till the pH of the slurry became less than 10, and dried at 80° C. overnight to obtain a powdery reaction product. SiO$_2$/Al$_2$O$_3$ (molar ratio) of the reaction product was 13.3 and the Fe content was 1.5 weight %.

Subsequently, to the Na-type Fe-containing mordenite was added 0.5 mol/l (81 g/1000 ml) of an aqueous ammonium nitrate solution (about 5 times equivalent of Na = 500 ml/Na-type Fe mordenite 20 g), and the mixed solution was stirred at 60° C. for one hour, filtered and washed with water. This treatment was repeated again and then the reaction product was dried at 110° C. for about 5 hours. Further, it was calcined at 500° C. for 2 hours to obtain an H-type Fe-containing mordenite.

Example of Preparation of a Monolith-Deposited Catalyst

The Fe-containing mordenite powder obtained according to the above <Example of production> was deposited on a monolithic carrier as below. As a carrier, a cordierite honeycomb carrier obtained by cutting a carrier with a sectional form shown in FIG. 1(a) into a column, with a diameter of 20 mmø (radius r=10 mm=1 cm), a length L of 23 mm and a cell number of 200/inch square was used. The volume of the honeycomb was 7.2 ml ($\pi$ r$^2$L= 3.14×12×2.3=7.2 cm$^3$) and the total surface area thereof coming into contact with an exhaust gas was 1.59×10$^{-2}$ m$^{-2}$ when it was set in a reactor for use.

On the other hand, 20 g of the above catalyst powder were mixed with 30 g of distilled water and 20 g of alumina sol (Alumina Sol-200, manufactured by Nissan Chemical Industries, Ltd.; trade name) and stirred to obtain an aqueous suspension. The above cordierite honeycomb carrier was impregnated with the aqueous suspension for 30 seconds to wash-coat it, then excess adhered slurries were removed by means of an air gun, and the resultant product was maintained at 115° C. for one hour and dried. The treatment was repeated three times. Subsequently, the dried product was maintained at 115° C. for 6 hours and then calcined at 500° C. for 2 hours, and excess adhered materials were removed by means of an air gun to obtain a monolith-deposited catalyst. The catalyst deposition amount of this honeycomb-deposited catalyst was 116.0 g/l.

Example of Preparation of a Particulate Catalyst=Comparative Example

The Fe-containing mordenite powder obtained according to the above <Example of Production> was introduced into a press, pressed at a pressure of 500 kg/cm² and pulverized. The pulverized product was made into pulverized particles with a particle diameter of 355–710 μm (average particle diameter: 533 /μm) by use of a sieve and used as a specimen catalyst for the Comparative Example. The pulverized particle had a volume density on charging of 0.576 g/ml, a real density of 0.96 g/ml with a porosity of 0.4, and hence a geometric surface area of $1.17 \times 10^{-2}$ m²/g. Namely, when 0.5183 g of the pulverized particle catalyst is set into a reaction tube as a catalyst bed for use, the total surface area coming into contact with an exhaust gas is $6.06 \times 10^{-3}$ m$^{-2}$.

Cleaning Test

Using the thus obtained monolith-deposited catalyst and 0.9 ml of the above specimen catalyst for Comparative Example, an experiment of purifying a $NO_x$-containing exhaust gas was performed. As a reaction device, a tubular fixed bed running-type reaction device with an inner diameter of 20 mm was used and the above monolith-deposited catalyst was inserted into the reaction tube. The specimen catalyst for the Comparative Example (pulverized particle) was used in a tubular fixed bed running-type reaction device with an inner diameter of 10 mm and the pulverized particle catalyst was held layer-like in the reaction tube of glass wool. As an exhaust gas to be treated, a gas containing 48 ppm of NO, 910 ppm of CO, 6.8% of $CO_2$, 9.1% of $O_2$, 9.1% of steam and $N_2$ as the balance was used, and the experiment was conducted at a treatment temperature of 250° to 450° C. The amount of the exhaust gas to be treated was determined so that a space velocity should be 660000 hr$^{-1}$ the monolith-deposited catalyst and 220000 hr$^{-1}$ in the Comparative Example.

Ammonium acetate as a reducing agent in the purification experiment was sprayed into the reaction tube just before a catalyst bed as an aqueous solution thereof and introduced into it so that the amount of the reducing agent should be 36 ppm (in terms of N) in the exhaust gas to be treated, and $NO_x$ removal ratios were measured at reaction temperatures of 250°, 300°, 325°, 350°, 375°, 400°, 425° and 450° C. The results are shown in Table 4.

As shown in Table 4, the Comparative Example shows a peak of a $NO_x$ removal ratio of over 70% at a reaction temperature of 300° C., but the ratio decreases at a lower temperature region and a higher temperature region rapidly. On the other hand, the $NO_x$ removal ratio in the Example using a monolith-deposited catalyst reaches about 70% around 325° C. and can be maintained almost the same at a reaction temperature of 450° C.

An exhaust gas from a gas engine is discharged generally at a temperature of the order of 300°–500° C. If the exhaust gas is discharged, for example, at 350° C., it is necessary to cool and control the temperature of the exhaust gas and/or the catalyst bed to about 300° C. in order to allow the catalyst of the Comparative Example to function effectively. It is apparent, however, that the monolith-deposited catalyst according to the present invention can purify $NO_x$ effectively without needing such cooling.

The space velocity of Example IV is different from that of Comparative Example. The "passing rates of an exhaust gas per contact area" of both catalysts calculated according to the above values are as below.

Both values were obtained under almost the same conditions.

(1) Passing rate of a gas in Example IV: Vh (m/h)= $66000 \times 7.2 \times 10^{-6}/1.59 \times 10^{-2}$= 29.9 (m/h)
(2) Passing rate of a gas in Comparative Example: Vp (m/h): $220000 \times 0.9 \times 10^{-6}/6.06 \times 10^{-3}$ =32.6 (m/h)

EXAMPLE V

Using a honeycomb-deposited catalyst produced according to the same procedure as in Example IV and setting it in the same fixed bed running-type reaction device as in Example IV, a durability experiment of the purification treatment of a $NO_x$-containing exhaust gas was performed in the present Example V. As an exhaust gas to be treated a gas containing 90 ppm of NO, 910 ppm of CO, 6.8% of $CO_2$, 9.1% of $O_2$, 9.1% of steam and $N_2$ as the balance was used, and the experiment was conducted at a treatment temperature of 375° C. Ammonium acetate as a reducing agent was sprayed into the reaction tube just before a catalyst layer as an aqueous solution thereof and introduced into it so that the amount of the reducing agent should be 68 ppm (in terms of N) in the exhaust gas to be treated.

Figure 5:
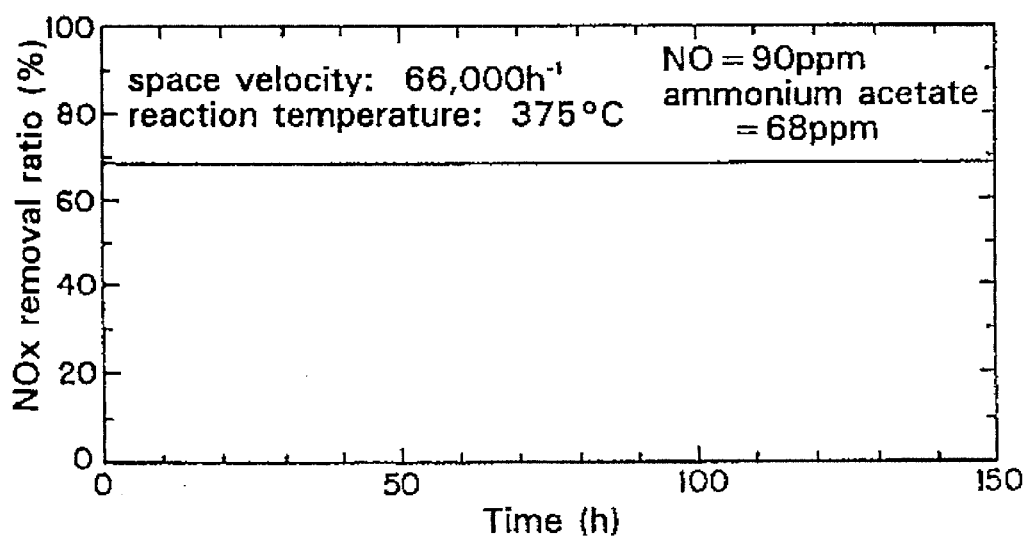
FIG. 5 shows the change of $NO_x$ removal ratios with time elapsed of a treatment by use of a monolith-deposited catalyst.

FIG. 5 shows the results of performing an experiment at a space velocity of the gas to be treated of 660000 hr$^{-1}$. As shown in FIG. 5, the honeycomb-deposited catalyst according to the present invention showed a $NO_x$ removal ratio of nearly 70 from the beginning, showed no change in the $NO_x$ removal ratio even after 150 hours and maintained a high $NO_x$-removing ability.

What is claimed is:

1. A process for reducing $NO_x$ contained in an exhaust gas comprising contacting a $NO_x$-containing exhaust gas with a mordenite catalyst containing Fe in an amount of 0.3–4.7 wt. % in the framework of the mordenite in the presence of an ammonium acetate reducing agent at a treatment temperature of 300° C. or higher thereby reducing said $NO_x$.

2. A process according to claim 1, wherein ammonium acetate is sprayed into a stream of a $NO_x$-containing exhaust gas as an aqueous solution.

3. A process according to claim 1, wherein the mordenite catalyst containing Fe in the framework of the mordenite is obtained by modifying the mordenite with an Fe salt in a strong acid with a pH of 1 or less.

4. A process according to claim 1, wherein the mordenite catalyst containing Fe in the framework of the mordenite is a synthesized mordenite crystal obtained by adding an Fe-containing material to a mixture of a silica material, an alumina material and an alkali metal compound or an alkali earth metal compound, and hydrothermally reacting the resulting mixture.

5. A process for reducing $NO_x$ contained in an exhaust gas comprising contacting a $NO_x$-containing exhaust gas with a catalyst in the form of a monolithic body composed of mordenite containing Fe in an amount of 0.3–4.7 wt. % in the framework of the mordenite in the presence of an ammonium acetate reducing agent at a treatment temperature of 300° C. or higher thereby reducing said $NO_x$.

6. A process according to claim 5, wherein ammonium acetate is sprayed into a stream of a $NO_x$-containing exhaust gas as an aqueous solution.

7. A process according to claim 5, wherein the mordenite catalyst containing Fe in the framework of the mordenite is obtained by modifying the mordenite with an Fe salt in a strong acid with a pH of 1 or less.

8. A process according to claim 5, wherein the mordenite catalyst containing Fe in the framework of the mordenite is a synthesized mordenite crystal containing Fe in the framework of the mordenite by adding a Fe-containing material to a mixture of a silica material, an alumina material and an alkali metal compound or an alkali earth metal compound, and hydrothermally reacting the resulting mixture.

9. A process according to claim 5, wherein the monolithic body is obtained by depositing mordenite containing Fe in the framework of the mordenite on a monolithic carrier.

10. A process according to claim 9, wherein the monolithic carrier is made from a ceramic or a metal.

* * * * *

UNITED STATES PATENT AND TRADEMARK OFFICE
CERTIFICATE OF CORRECTION

PATENT NO. : 5,543,125
DATED : August 6, 1996
INVENTOR(S) : Hiroshi UCHIDA et al It is certified that error appears in the above-indentified patent and that said Letters Patent is hereby corrected as shown below:

On the title page, item [54];

change "NON-CONTAINING" to ---$NO_x$-CONTAINING---.

Signed and Sealed this

Twenty-sixth Day of November 1996

Attest:

BRUCE LEHMAN

*Attesting Officer*  *Commissioner of Patents and Trademarks*